United States Patent
Burkhard et al.

(10) Patent No.: US 7,224,864 B2
(45) Date of Patent: May 29, 2007

(54) METHOD FOR CONNECTING AN OPTICAL FIBER TO A GRIN LENS, AND A METHOD FOR PRODUCING OPTICAL FILTER MODULES AND FILTER MODULES PRODUCED ACCORDING TO SAID METHOD

(75) Inventors: Danielzik Burkhard, Bingen (DE); Uwe Nolte, Gau-Algesheim (DE); Ingo Köhler, Mainz (DE); Noboru Kobayashi, Speyer (DE); Christoph Hermanns, Mainz Laubenheim (DE); Bernd Hoetzel, Wörrstadt (DE); Eric Senner, Hackenheim (DE); Patrick Markschläger, Nieder-Olm (DE); Christian Thiemann, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/479,917

(22) PCT Filed: Jun. 6, 2002

(86) PCT No.: PCT/EP02/06213

§ 371 (c)(1),
(2), (4) Date: May 24, 2004

(87) PCT Pub. No.: WO02/099485

PCT Pub. Date: Dec. 12, 2002

(65) Prior Publication Data

US 2004/0208443 A1    Oct. 21, 2004

(30) Foreign Application Priority Data

Jun. 7, 2001  (DE)  ................ 101 27 331

(51) Int. Cl.
G02B 6/32     (2006.01)
G02B 6/255    (2006.01)
G02B 6/00     (2006.01)
(52) U.S. Cl. .......................................... 385/34; 385/96
(58) Field of Classification Search ................. 385/33, 385/34, 95–99
See application file for complete search history.

(56) References Cited

U.S. PATENT DOCUMENTS 4,962,988 A    10/1990  Swann .................... 350/96.18

(Continued)

FOREIGN PATENT DOCUMENTS

DE    199 27 167    11/2000

(Continued)

OTHER PUBLICATIONS

International Search Report, dated Apr. 28, 2003.
International Preliminary Examination Report, dated Oct. 8, 2003.

*Primary Examiner*—Sung Pak
(74) *Attorney, Agent, or Firm*—Ohlandt, Greeley, Ruggiero & Perle, L.L.P.

(57) ABSTRACT

Method for connecting an optical fiber to a GRIN lens, and a method for producing an optical filter module having an optical fiber and a GRIN lens, comprising arranging the optical fiber in contact with or in the immediate vicinity of the GRIN lens, directing a laser beam onto a part of the optical fiber and/or a part of the GRIN lens, the laser beam heating at least a part of the optical fiber and/or a part of the GRIN lens in such a way that a connection is formed between the optical fiber and the GRIN lens, and the optical axis of the laser beam being aligned oblique to the optical axis of the optical fiber, as well as optical filter modules produced in accordance with the method.

27 Claims, 3 Drawing Sheets

U.S. PATENT DOCUMENTS

| | | | |
|---|---|---|---|
| 5,009,482 A | 4/1991 | Lincoln | 350/96.18 |
| 5,299,272 A | 3/1994 | Buchin | 385/34 |
| 6,033,515 A * | 3/2000 | Walters et al. | 156/272.8 |
| 6,411,759 B1 * | 6/2002 | Beguin et al. | 385/49 |
| 6,652,972 B1 | 11/2003 | Conzone et al. | 428/426 |
| 6,780,274 B2 * | 8/2004 | Bernard et al. | 156/272.8 |
| 6,798,943 B2 * | 9/2004 | Towery | 385/18 |
| 2002/0089711 A1 | 7/2002 | Conzone et al. | 359/109 |
| 2003/0219213 A1 * | 11/2003 | Blarasin et al. | 385/52 |

FOREIGN PATENT DOCUMENTS

| | | |
|---|---|---|
| EP | 1128960 | 9/2001 |
| WO | WO 00/03873 | 1/2000 |
| WO | WO 01/32580 | 5/2001 |
| WO | WO 01/38913 | 5/2001 |
| WO | WO 01/38914 | 5/2001 |

* cited by examiner

METHOD FOR CONNECTING AN OPTICAL FIBER TO A GRIN LENS, AND A METHOD FOR PRODUCING OPTICAL FILTER MODULES AND FILTER MODULES PRODUCED ACCORDING TO SAID METHOD

This application is a 371 of PCT/EP02/06213 filed Jun. 6, 2002.

BACKGROUND OF THE INVENTION

The invention relates to a method for connecting an optical fiber to a GRIN lens, and to a method for producing optical filter modules and filter modules produced in accordance with the method.

DESCRIPTION OF RELATED ART

A method for connecting an optical fiber to a GRIN lens, in the case of which laser energy is used to produce a connecting area between the fiber and GRIN lens, is disclosed in PCT/US99/14958, but in accordance therewith an alignment of the laser radiation is undertaken in which the optical axis of the laser radiation used runs substantially coaxially with the optical axis of the optical fiber. However, this may lead to instances of vignetting of the laser radiation that are due to the fiber itself or to adjacent, already fitted fibers, and that can have a disadvantageous effect on the energy distribution introduced and on the heating following therefrom. Furthermore, this method requires the beam to be guided optically in a way that is complicated and difficult to manipulate, in order to achieve exacting focusing of the optical energy. Moreover, the radiation performed on the optical axis of the fiber has the disadvantage that the fiber itself can be heated only with difficulty or not at all, since only a small portion, if any, of the optical energy strikes the fiber itself, and still a majority of this small portion is reflected. In order to achieve a good connection, it is therefore necessary to introduce more energy into the GRIN lens in order thereby also to heat the fiber and to achieve a fusion zone both in the fiber and in the GRIN lens. However, this introduction of more heat has the grave disadvantage, in turn, that a larger area of the GRIN lens is heated and that, during production of a connection of a plurality of fibers, already fitted fibers adjacent to the GRIN lens can be detached again by the heating. However, the minimum possible mutual spacing of the fibers is thereby severely limited, which in turn signifies structural limitations, in particular in the case of collimator arrangements that are operated using reflection, such as are used in WDM and DWDM filter modules, for example.

The documents WO 01/38914 A and U.S. Pat. No. 5,009,482 describe fusion splices of an optical fiber to an optical element by means of a laser beam. Here the laser beam runs perpendicular to the optical fiber.

The leaflet entitled "Optoelectronic Interconnection Technology" from the Fraunhofer Institute for Reliability and Micro-integration exhibits an arrangement comprising an integrated optical circuit with an optical fiber in the case of which the optical fiber has been fitted on the optical circuit by means of a $CO_2$ laser. This leaflet does not, however, supply any information on how the fiber was fitted on the optical circuit.

The document DE 199 27 167 A describes a procedure for the production of a coupling element from a light fiber and a radiate-forming element. Here the radiate-forming element can be a GRIN-lens, which is weldet among other things by means of a laser beam with the optical fiber. It is not said in the document, how the energy is exactly brought to welding to the junction point.

SUMMARY OF THE INVENTION

It is the object of the invention to provide a method for producing a connection between a GRIN lens and an optical fiber, as well as for producing an optical filter module in the case of which the limitations on the optical construction are less strongly pronounced and, in particular, the construction of optical filter modules is less strongly limited, and yet nevertheless reliable connection is achieved between the fiber and GRIN lens.

Highly surprisingly, this object is achieved with the aid of a method having the features of claims 1 and 17, as well as with the aid of filter modules in accordance with one of claims 22 to 24.

By using the method for connecting an optical fiber to a GRIN lens, comprising arranging the optical fiber in contact with or in the immediate vicinity of the GRIN lens, directing a laser beam onto a part of the optical fiber and/or a part of the GRIN lens, the laser beam heating at least a part of the optical fiber and/or a part of the GRIN lens in such a way that a connection is formed between the optical fiber and the GRIN lens, and the optical axis of the laser beam being aligned oblique to the optical axis of the optical fiber, it is possible for the laser beam to act in a way that can be set exactly both on the optical fiber and on the GRIN lens, and thus for the optical energy introduced and thermal energy following therefrom by adsorption and active in producing the connection to be very finely dosed. This means that the heating both of the fiber and of the GRIN lens can be set optimally and that consequently smaller heating areas are required in the GRIN lens. However, as a consequence of this there is a much lesser likelihood of adjacent fibers being detached by also being heated, and it is possible to achieve a closer arrangement of the fibers, and thus a better optical structure, in particular in the case of collimator arrangements operated using retroreflection.

In the context of the invention, the optical axis of the laser beam is understood to be the axis of symmetry of the laser beam or that direction in which most of the light of the laser beam is propagated, the optical axis of an optical fiber or GRIN lens being well known to the person skilled in the art in this field.

Furthermore, the method according to the invention also permits solely the attachment of an area of the cladding of the optical fiber, and the subsequent reinforcement of this fastening by further suitable means, such that the required heat to be introduced is thereby once again reduced and a detachment of adjacent fibers is still more effectively avoided.

The oblique irradiation of the laser energy leads, furthermore, to simplified optical processing devices, since it is necessary only to focus appropriately onto the area to be connected, or the vicinity thereof. However, it is advantageous if the connection between at least a part of the optical fiber and a part of the GRIN lens comprises a connection of the optically conducting core region of the optical fiber to the GRIN lens, since then virtually no reflections at any time occur at the connecting point, since the fused area leads to a less sharply pronounced transition of refractive index, and reflections at interfaces are virtually completely excluded. The values that can thereby be achieved for the return loss are outstanding and are, as a rule, above 50 dB, or even above 60 dB.

A very exact dosing of the laser power introduced can also be achieved, furthermore, when the laser beam acts only during a short time interval on the part of the optical fiber and/or the part of the GRIN lens that defines the area to be connected.

Particularly during mass production, the laser beam can act on the area to be connected in a controlled temporal pulse sequence, in order in this way to achieve the defined desired fusion zones with the aid of a prescribed number of pulses, and to permit a possibly required correction of the process parameters to be performed in a simple way with the aid of changed numbers of pulses.

In a particularly preferred embodiment, the laser beam is a $CO_2$ laser beam.

It is very advantageous, furthermore, when the optical fiber is firstly fastened in an adjusted position on the GRIN lens, and thereafter the connection of the optical fiber to the GRIN lens is reinforced with further fastening means, in which case the reinforcement with the aid of further fastening means can comprise applying adhesive, applying and fusing soldering fluxes, in particular applying and fusing solder glass, and/or casting the arrangement of optical fiber and GRIN lens, in particular casting with the aid of a curable synthetic resin.

It is extremely advantageous, furthermore, when the solder glass includes a colorant that absorbs at least a portion of the acting laser radiation, because then it is possible to heat the solder glass selectively with the aid of a strongly absorbed laser radiation, and a defined heating of the solder glass which is, however, reduced by its surroundings can thereby be performed. If there are absorption areas of the colorant of the solder glass within the wavelength areas of the radiation used later in operating the optical module, the colorant can absorb scattered radiation and interfering background radiation can thereby be reduced.

Particularly well suited for this purpose are colorants that contain iron or an iron compound, because these absorb both $CO_2$ laser radiation and the optical signals in the infrared that are used in optical telecommunications. Furthermore, a particularly preferred embodiment provides that the reinforcement with further fastening means comprises low-temperature bonding, as is described, for example, in American Patent Application "Low Temperature Joining of Phosphate Glass", applied for Nov. 1, 1999, Ser. No. 09/430,885, and in PCT/US00/41720 entitled "Photonic Devices for Optical and Optoelectronic Information Processing", the contents of which are fully incorporated by reference into the subject matter of the present application. Furthermore, the contents of the US PCT Application No. PCT/US00/41721 "Low Temperature Joining of Materials", which was filed on the same date at the United States Patent and Trade Mark Office as the application PCT/US00/41720, have been fully incorporated by reference into the subject matter of the present description.

The laser beam is advantageously focused onto the area to be connected, in order to introduce as little energy as possible into undesired areas.

Furthermore, the laser beam can alternatively be "overfocused", which means that it can be focused onto a plane running in the GRIN lens, in order to heat the GRIN lens more strongly in depth in order thereby to permit in the heated state a fine adjustment of the fiber both in the lateral direction and in the axial one. During adjustment in the axial direction, the optical fiber is pushed onto the GRIN lens in its heated state or in the heated state of the GRIN lens, or during both.

Furthermore, a stress relief device can be fitted on the arrangement of GRIN lens and optical fiber, in order to protect the combination of fiber and GRIN lens as well as possible from mechanical stresses in the axial direction.

Moreover, it is within the scope of the invention to fit a multiplicity of optical fibers on the GRIN lens.

Moreover, arranging the combination of an optical fiber and a GRIN lens, or a multiplicity of optical fibers and a GRIN lens in a fashion aligned relative to an optical filter provides a particularly advantageous method for producing optical filter modules that is able to access essentially all the advantages outlined above.

Alternatively, the GRIN lens can firstly be arranged in a fashion aligned relative to the optical filter, and the optical fiber or the optical fibers can subsequently be connected to the GRIN lens.

A filter module that can be operated using both reflection and transmission is provided by virtue of the fact that a further combination of optical fiber or optical fibers and GRIN lens is arranged in a fashion adjusted relative to the optical filter.

Particularly preferred filter modules are WDM filter modules (Wavelength Division Multiplexed Filter Modules) or DWDM filter modules (Dense Wavelength Division Multiplexed Filter Modules) as well as CDWDM filter modules (Coarse Dense Wavelength Division Multiplexed Filter Modules).

The invention is described in more detail below with the aid of preferred embodiments and with reference to the attached drawings, in which:

DETAILED DESCRIPTION OF THE INVENTION

The invention is described in more detail below with the aid of preferred embodiments. In this description, the term laser radiation is not restrictive in effect, but also comprises incoherent electromagnetic radiation that is suitable for producing in the glass of the GRIN lens and of the optical fiber an interaction that can lead to a connection of the two.

Furthermore, the term connection covers a purely mechanical connection with high retaining forces that can retain as far as rupture of the fiber in the case of attempts at detachment, and an essentially optical connection with only small mechanical retaining forces that permit transmission of optical signals, both respectively on their own, and also an optical and mechanical connection in combination.

Figure 1:
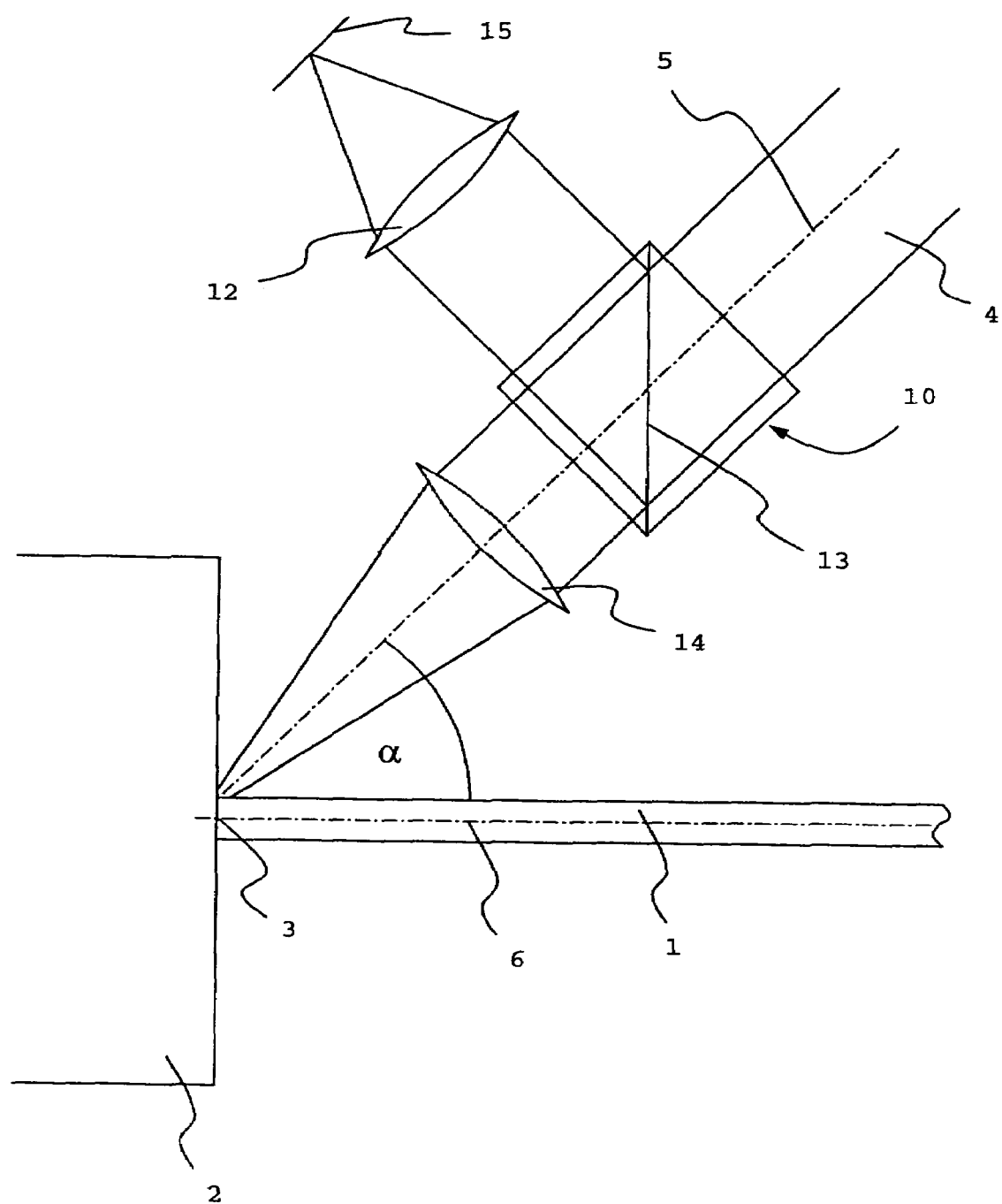
FIG. 1 shows the optical arrangement for carrying out the method according to the invention in a schematic side view, with the aid of which an optical fiber can be fitted on a GRIN lens.

Reference is made below to FIG. 1, which shows in a schematic side view the optical arrangement for carrying out the method according to the invention with the aid of which an optical fiber can be fitted on a GRIN lens.

In the case of the method according to the invention, an optical fiber 1 is connected to a GRIN lens 2 by virtue of the fact that, firstly, retaining and positioning means, which are not illustrated in the figures but are well known to the person skilled in the art in this field, are used to arrange the front end 3 of the optical fiber 1 in contact with, or in the immediate vicinity of the GRIN lens 2, which is likewise retained in a correspondingly positioned fashion.

Subsequently, a laser beam 4 is directed onto a part of the optical fiber and/or a part of the GRIN lens 2 in such a way that the laser beam 2 heats at least a part of the optical fiber 1 and/or a part of the GRIN lens 2 by absorption of laser radiation. This local heating results in a connection between the optical fiber 1 and the GRIN lens 2.

The optical axis 5 of the laser beam 4 is arranged obliquely to the optical axis 6 of the fiber 1, which means that the internal intermediate angle $\alpha$ is in a range from approximately 5 to 85 degrees, preferably in a range from 15 to 75 degrees, and is most preferably in a range from 35 to 55 degrees.

The laser beam 4 is focused and can be irradiated in a temporally pulsed fashion or in CW mode. Furthermore, the laser beam can be switched on and off programmably at defined temporal spaces, it also being possible to set fixed numbers of pulses.

In a particularly preferred embodiment, the laser beam is a $CO_2$ laser beam and is used for the purpose of fastening the optical fiber 1 in an adjusted position on the GRIN lens, which means producing an at least partially mechanical connection between the optical fiber 1 and the GRIN lens 2 that is suitable for serving at least as a fixing for mounting further fastening means.

Serving as further fastening means 7 are adhesive, in particular an epoxy resin adhesive or generally curable resins, and included also are the application and fusing of soldering fluxes, in particular the application and fusing of solder glass and/or the casting of the arrangement of optical fiber 1 and GRIN lens, in particular the casting with the aid of a curable synthetic resin.

It is advantageous in this case when the further fastening means are optically transparent and, if the latter fill up any remaining gaps between fiber 1 and GRIN lens 2, as far as possible no or only a few additional absorption and reflection losses or instances of backscattering are introduced.

In the most preferred embodiment, the laser beam 4 is focused onto the area 8 to be connected, which comprises the optically conducting core region 9 of the optical fiber 1, and thus connects this core region 9 to the GRIN lens 2. This results in fusing of the glass of the core region 9 to the glass of the GRIN lens 2, and in soft transitions of refractive index that lead to reduced reflection.

A monitoring arrangement 10 that comprises a beam splitter 11 and an imaging system 12 has the purpose of more effectively detecting the positioning of the laser beam, 4.

The beam splitter 10 has a dielectric reflection layer 13 that acts transparently in the spectral region of the $CO_2$ laser, the infrared, but in a reflecting fashion in the visible spectrum, or that relevant to observation. As a result, it is possible to produce in the image plane 15 a real image of the region of focus of the laser beam 4 in a magnifying image in the cooperation of the focusing lens 14 with the aid of the imaging system 12, illustrated diagrammatically as a positive lens, and thereby to observe exactly a correct positioning and, moreover, the fusing behavior of the optical fiber 1 and the GRIN lens 2.

Instead of the imaging system 12 for producing the real image, a video camera (not illustrated in the figures) can provide feedback to a computer-aided control system that permits the automated tracking of the laser beam 4 and the automated or partially automated control of the intensity of the laser beam 4.

Figure 2:
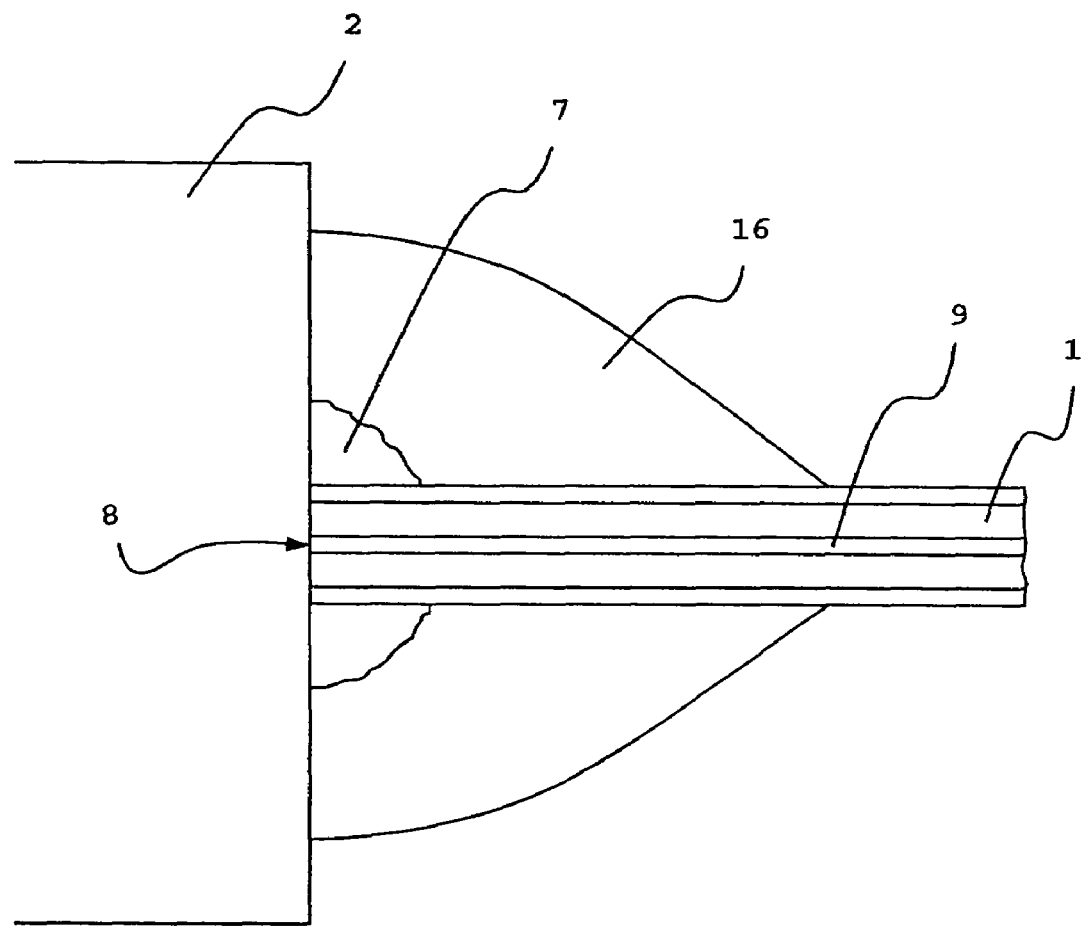
FIG. 2 shows a detailed illustration of an optical fiber fitted on a GRIN lens.

Furthermore, the arrangement illustrated in FIG. 1 can also be used for the purpose of fusing solder glass, which is provided schematically in FIG. 2 with the reference numeral 7, and thereby to provide the further fastening means. In a particularly preferred embodiment, the solder glass comprises a colorant that absorbs the laser radiation and includes, for example, iron or an iron compound.

If adhesive or epoxy resin or a low-temperature bonding agent is used as further fastening means, as is described in more detail, for example, in the previously cited and incorporated documents, the monitoring arrangement 10 can serve the purpose of monitoring that the further fastening means are correctly applied and, moreover, even detecting their curing, if appropriate.

Instead of the previously described method cycle with adjusted positioning of the fiber, the latter can also be pushed in its heated state and/or in the heated state of the GRIN lens onto the latter and be positioned axially therewith, as well as further be displaced laterally a little, at least in the range of a few micrometers. Moreover, the use of a temporally pulsed sequence of the pulses of laser radiation permits the fiber 1 to be repositioned relative to the GRIN lens 2, at least in the range of a few micrometers, an additional optical fine adjustment thereby being provided.

After the fiber 1 has been connected to the GRIN lens 2, there is fitted on the fiber 1 and the GRIN lens 2 a stress relief device 16 by means of which both axial and lateral forces can no longer lead to detachment of the fiber 1 from the GRIN lens 2. The stress relief device 16 can comprise thermoplastic materials, curable epoxy resins and UV-crosslinkable polymers, and is preferably of permanently elastic design in order to avoid thermal stresses as far as possible.

A preferred embodiment of the subject matter produced according to the invention comprises a GRIN lens collimator with optical fiber for constructing an optical filter module.

Preferred values of this arrangement are to be gathered from Table 1.

TABLE 1

Single & Dual & Multiple Fiber Collimator

|  | Unit | Single Fiber Collimator | Dual Fiber Collimator |
|---|---|---|---|
| Center Wavelength | nm | 1550 | |
| Spectral bandwidth | nm | 60 | |
| Insertion Loss | dB | <0.1 | <0.15 |
| Return Loss | dB | >55 | >55 |
| Acceptance Angle | degree | 0.5 | |
| Beam Diameter | mm | 0.5 | |
| Beam Divergence | degree | 0.25 | |
| Beam Transmission Angle | degree | <1.0 | <2.0 |
| Working Distance | mm | 5 | |
| Maximum Optical Power | mW | 300 | |
| Tensile Load | N | 5 | |
| Operation Temperature | ° C. | −20 to +65 | |
| Storage Temperature | ° C. | −40 to +85 | |
| Fiber Length | m | 2.5 | |

The English terms used in Table 1 are well known to the person skilled in the art in this field and constitute the most customary linguistic usage in this specialist field, for which reason it was decided not to translate this information.

Figure 3:
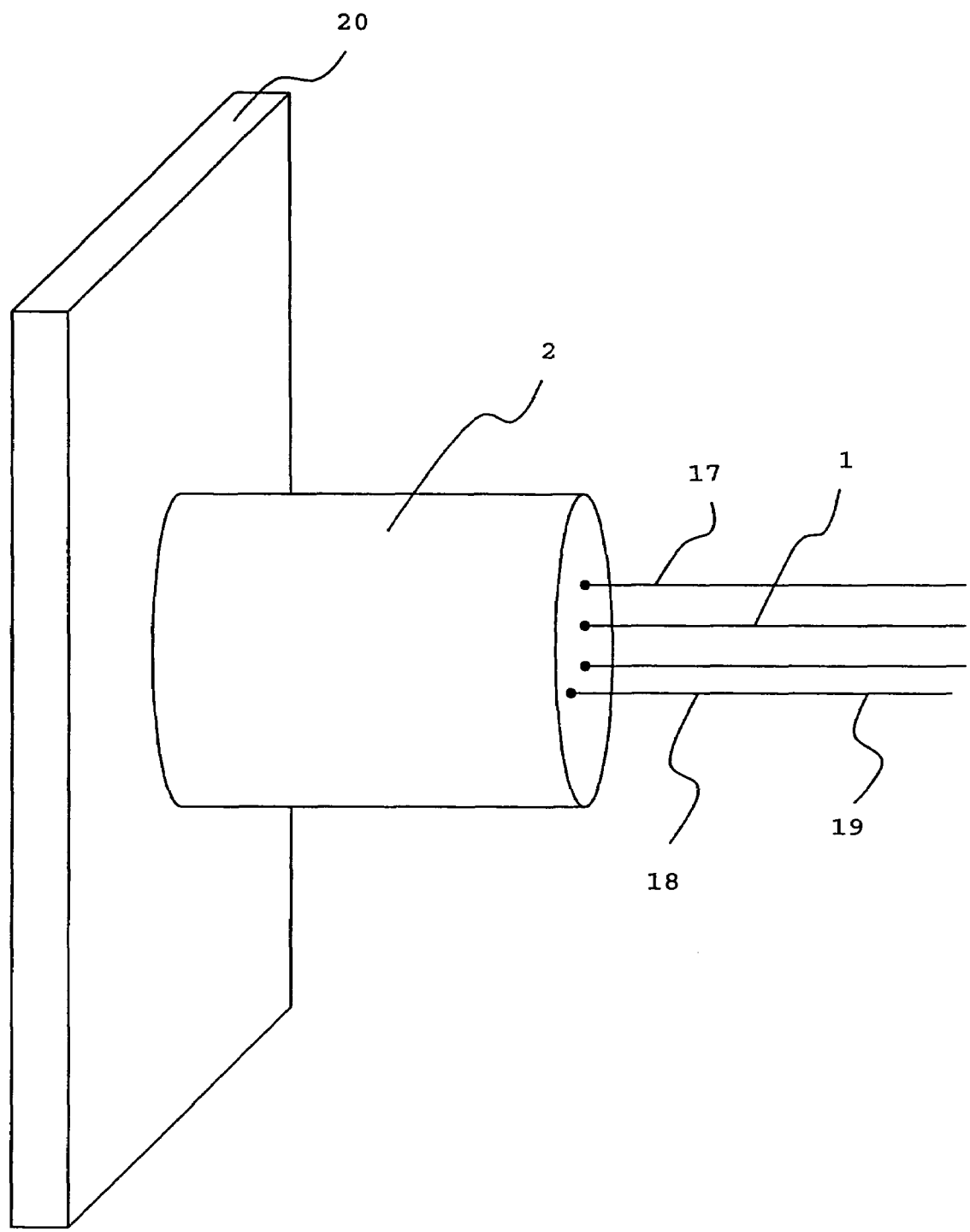
FIG. 3 shows an illustration of a GRIN lens with a multiplicity of optical fibers fitted thereon.

In an alternative embodiment, it is possible, as illustrated in FIG. 3, for a multiplicity of optical fibers 1, 17, 18, 19 to be fitted on the GRIN lens as, for example, a linear or two-dimensional array.

In order to produce an optical filter module, the combination of GRIN lens 2 with optical fiber 1 or optical fibers 1, 17, 18, 19 is arranged in a fashion aligned or adjusted relative to a filter 20. The pitch of the GRIN lens 2 is thereby selected such that a collimator arrangement results which feeds back light filtered from an input fiber, for example from the optical fiber 1, into an output fiber, for example into the optical fiber 17.

The filter 20 can be a WDM, DWDM or CDWDM filter, a WDM, DWDM or a CDWDM filter module thereby being provided.

Furthermore, the GRIN lens 2 can firstly be arranged in a fashion adjusted relative to the filter 20, and thereafter the fiber 1 or the fibers 1, 17, 18, 19 can be connected to the GRIN lens 2 in an adjusted fashion.

It is also possible, furthermore, in a way not illustrated in the figures for a further GRIN lens to be arranged with the optical fiber or optical fibers in an essentially mirror symmetrical fashion with reference to the filter 20 such that transmitted filtered optical signals can also be passed on in these optical fibers.

The invention is not limited to specific forms of the housing of the filter module, or to specific fastening or adjusting devices of the filter module housings, but can be used in a wide range, in particular also in the case of non-collimating GRIN lens arrangements.

The invention claimed is:

1. A method for connecting an optical fiber to a GRIN lens, comprising:
    arranging the optical fiber in contact with or in the immediate vicinity of the GRIN lens,
    directing a laser beam onto a part of the optical fiber and a part of the GRIN lens, said laser beam heating at least said part of the optical fiber and said part of the GRIN lens in such a way that a connection is formed between the optical fiber and the GRIN lens, said laser beam having a first optical axis and said optical fiber having a second optical axis, said first optical axis being aligned oblique to said second optical axis, and said first optical axis and said second optical axis intersect at an angle that ranges from 15 to 75 degrees.

2. The method as claimed in claim 1, wherein said connection connects an optically conducting core region of the optical fiber to the GRIN lens.

3. The method as claimed in claim 1, wherein said laser beam acts only during a short time interval on said part of the optical fiber and said part of the GRIN lens.

4. The method as claimed in claim 3, further comprising controlling said laser beam to act in a controlled temporal pulse sequence.

5. The method as claimed in claim 1, wherein said laser beam is a $CO_2$ laser beam.

6. The method as claimed in claim 1, further comprising fastening the optical fiber in an adjusted position on the GRIN lens, and thereafter reinforcing said connection with a fastening means.

7. The method as claimed in claim 6, wherein said fastening means comprises applying an adhesive, applying and fusing a soldering flux, casting the arrangement of optical fiber and GRIN lens, and any combinations thereof.

8. The method as claimed in claim 7, wherein said soldering flux comprises a solder glass having a colorant that absorbs at least a portion of said laser beam.

9. The method as claimed in claim 8, wherein said colorant comprises iron or an iron compound.

10. The method as claimed in claim 6, wherein said fastening means comprises low-temperature bonding.

11. The method as claimed in claim 1, wherein said laser beam is focused onto said part of the optical fiber and said part of the GRIN lens.

12. The method as claimed in claim 1, wherein said laser beam is focused onto a plane running in the GRIN lens.

13. The method as claimed in claim 1 further, comprising pushing the optical fiber onto the GRIN lens after heating said part of the optical fiber and said part of the GRIN lens with said laser beam.

14. The method as claimed in claim 13, wherein the relative positions of the optical fiber with reference to the GRIN lens in the heated state of an area of the GRIN lens and/or of an area of the optical fiber further comprise fine adjustments of said part of the optical fiber and said part of the GRIN lens relative to one another in the lateral arrangement thereof.

15. The method as claimed in claim 1, further comprising fitting a stress relief device on said connection.

16. The method as claimed in claim 1, further comprising fitting a multiplicity of optical fibers on the GRIN lens.

17. A method for producing an optical filter module, comprising:
    arranging an optical fiber in contact with or in the immediate vicinity of a GRIN lens,
    directing a laser beam onto a part of said optical fiber, said laser beam heating at least said part of said optical fiber in such a way that a connection is formed between said part of said optical fiber and a part of said GRIN lens, said laser beam having a first optical axis and said optical fiber having a second optical axis, said first optical axis being aligned oblique to said second optical axis, and said first optical axis and said second optical axis intersect at an angle that ranges from 15 to 75 degrees.

18. The method as claimed in claim 17, further comprising arranging and fastening said optical fiber and said GRIN lens in a fashion aligned relative to an optical filter.

19. The method as claimed in claim 18, wherein said GRIN lens is aligned relative to said optical filter before or subsequent to forming said connection.

20. The method as claimed in claim 18, further comprising a further combination of optical fiber or optical fibers and GRIN lens arranged and fastened in a fashion adjusted relative to said optical filter.

21. The method as claimed in claim 18, further comprising a further GRIN lens arranged and fastened relative to said optical filter, and subsequently one or more further optical fibers are connected to said further GRIN lens.

22. A method for connecting an optical fiber to a GRIN lens, comprising:
    arranging a first part of the optical fiber with respect to a second part of the GRIN lens, the optical fiber having a first optical axis;
    arranging a laser beam having a second optical axis and the optical fiber with respect to one another so that said first and second optical axes form an angle that ranges from 15 to 75 degrees; and
    heating said first part and said second part with said laser beam so that said first and second parts are connected to one another.

23. The method as claimed in claim 22, wherein said first and second parts are arranged in contact with one another or in the immediate vicinity of one another.

24. The method as claimed in claim 22, wherein said first part comprises an optically conducting core region of the optical fiber.

25. The method as claimed in claim 22, further comprising focusing said laser beam at a desired location, said desired location being selected from the group consisting of said first part, said second part, a plane running in the GRIN lens, and any combinations thereof.

26. The method as claimed in claim 1, wherein said angle ranges from 35 to 55 degrees.

27. The method as claimed in claim 22, wherein said angle ranges from 35 to 55 degrees.

* * * * *